United States Patent [19]
Davis et al.

[11] Patent Number: 5,900,383
[45] Date of Patent: May 4, 1999

[54] PROCESS FOR INCREASING THE ACTIVITY OF ZEOLITE CONTAINING PARTICULATE SOLIDS

[75] Inventors: Robert E. Davis, Hinsdale, Ill.; David B. Bartholic, Watchung, N.J.

[73] Assignee: New Life Catalyst, Inc., Wilmington, Del.

[21] Appl. No.: 08/581,836

[22] Filed: Jan. 2, 1996

[51] Int. Cl.$^6$ .................................................. B01J 20/34
[52] U.S. Cl. .............................. 502/22; 502/27; 502/29
[58] Field of Search ........................... 502/27, 28, 22, 502/25, 29, 33

[56] References Cited

U.S. PATENT DOCUMENTS

| | | |
|---|---|---|
| 3,647,718 | 3/1972 | Haden, Jr. et al. . |
| 4,163,709 | 8/1979 | Burk et al. ............................ 208/120 |
| 4,826,793 | 5/1989 | Velten et al. . |
| 4,985,136 | 1/1991 | Bartholic . |

FOREIGN PATENT DOCUMENTS

| | | | |
|---|---|---|---|
| 499 248 A1 | 2/1992 | European Pat. Off. | ......... B01J 29/38 |
| 499 258 A1 | 2/1992 | European Pat. Off. | ......... B01J 29/38 |

*Primary Examiner*—Michael Lewis
*Assistant Examiner*—Alexander G. Ghyka
*Attorney, Agent, or Firm*—Finnegan, Henderson, Farabow, Garrett & Dunner, L.L.P.

[57] ABSTRACT

A process for increasing the activity of a zeolite-containing particulate solid containing contaminants which block the pores of the zeolite and adversely affect the activity thereof wherein the contaminated zeolitic material is slurried with a liquid containing an acid, detergent or surfactant, the slurry is agitated to liberate the pore-blocking contaminants from the zeolite pores so that they are suspended in the liquid, a portion of the liquid is withdrawn from the slurry and filtered to remove the suspended contaminants, the resulting liquid is returned to the slurry, and the treated zeolite-containing particulate solid is liquid from the solution and recovered.

22 Claims, 1 Drawing Sheet

PROCESS FOR INCREASING THE ACTIVITY OF ZEOLITE CONTAINING PARTICULATE SOLIDS

FIELD OF THE INVENTION

This invention relates to a process for improving the activity of a particulate solid material containing a zeolitic material, and particularly to a process for reactivating a zeolite-containing hydrocarbon processing catalyst, such as those zeolitic catalysts known for use in fluid catalytic cracking, hydrocracking, alkylation, dealkylation, transalkylation, isomerization, polymerization, and separation processes.

BACKGROUND OF THE INVENTION

Zeolites are very common materials in nature and there are many types of synthetic zeolites. It is estimated that there are 34 species of zeolite minerals and about 100 types of synthetic zeolites.

Zeolites are used in a wide range of chemical process technologies. The wide variety of applications includes separation and recovery of normal paraffin hydrocarbons, catalyst for hydrocarbon reactions, drying of refrigerants, separation of air components, carrying catalyst in the curing of plastics and rubber, recovering radioactive ions from radioactive waste solutions, removing carbon dioxide at high altitudes, solubilizing enzymes, separating hydrogen isotopes, and removal of atmospheric pollutants such as sulfur dioxide. Cracking catalysts, such as those used in fluid catalytic cracking (FCC) and hydrocracking of hydrocarbon fractions, contain crystalline zeolites, often referred to as molecular sieves, and are now used in almost 100% of the FCC units, which process about 10 million barrels of oil per day.

Zeolites, or molecular sieves, have pores of uniform size, typically ranging from 3 to 10 angstroms, which are uniquely determined by the unit structure of the crystal. These pores will completely exclude molecules which are larger than the pore diameter. As formed in nature or synthesized, zeolites are crystalline, hydrated aluminosilicates of the Group I and Group II elements, in particular, sodium, potassium, magnesium, calcium, strontium, and barium, which can be exchanged with higher polyvalent ions, such as rare earths or with hydrogen. Structurally, the zeolites are "framework" aluminosilicates which are based on an infinitely extending three-dimensional network of $AlO_4$ and $SiO_4$ tetrahedra linked to each other by sharing all of the oxygens. Zeolites may be represented by the empirical formula:

$$M_{2/n}O \cdot Al_2O_3 \cdot xSiO_2 \cdot yH_2O$$

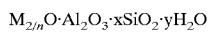

In this oxide formula, x is generally equal to or greater than 2 since $AlO_4$ tetrahedra are joined only to $SiO_4$ tetrahedra, n is the cation valence. The framework contains channels and interconnected voids which are occupied by the cation and water molecules. The cations are quite mobile and may be exchanged, to varying degrees, by other cations. Intercrystalline "zeolitic" water in many zeolites is removed continuously and reversibly. In many other zeolites, mineral and synthetic cation exchange or dehydration may produce structural changes in the framework.

As stated above, the uses for zeolites are many, but they typically must be combined with other materials when they are used in process applications. As an example, a synthesized zeolitic material, which is usually less than 4 microns in size, is combined with a binding agent, such as kaolin clay, silica sol, or amorphous silica, alumina, and zirconia as described in Demmel's U.S. Pat. No. 4,826,793 and then spray dried or extruded to produce a finished material that has the properties desired for the intended use. These properties may include attrition resistance, crush strength, particle size distribution, surface area, matrix area, activity and stability. Another method of producing a finished zeolite containing product would be to produce the zeolite in-situ as described in Hayden's U.S. Pat. No. 3,647,718. While these patents deal mainly with FCC type catalyst, similar procedures are used in the production of zeolitic materials for other process applications. As an example, most fixed bed zeolytic catalyst, such as those used in hydrocracking, alkylation, dealkylation, transalkylation, isomerization, polymerization, and separation processes, disperse the zeolytic component in a pellet that consists mainly of alumina. Based on our discovery it is our belief that in the manufacture of these fixed bed pelleted zeolitic catalyst and zeolitic FCC type catalyst that some of the zeolitic pores are blocked or buried within the matrix material and that our process can remove this blockage and increase the available zeolite. So not only is our process applicable to spent or equilibrium catalyst, but also to fresh catalyst.

An objective in refining crude petroleum oil has always been to produce maximum quantities of the highest value added products in order to improve the profitability of the refining. Except for specialty products with limited markets, the highest value added products of oil refining with the largest market have been transportation fuels, such as gasoline, jet fuel and diesel fuels. Historically, a major problem in the refining of crude oil has been to maximize the production of transportation fuels. This requires a refining process or method which can economically convert the heavy residual oil, the crude oil fraction boiling above about 1000° F., into the lighter boiling range transportation fuels. A major obstacle to the processing of this heavy residual oil has been the concentration of refining catalyst poisons, such as metals, nitrogen, sulfur, and asphaltenes (coke precursors), in this portion of the crude oil.

Since most of the oil refineries in the world use the well known fluid catalytic cracking (FCC) process as the major process for the upgrading of heavy gas oils to transportation fuels, it is only natural that the FCC process should be considered for use in the processing of heavy residual oils. Indeed, this has been the case for the last ten to fifteen years. However, the amount of residual oil that a refiner has been able to economically convert in the FCC process has been limited by the cost of replacement catalyst required as a result of catalyst deactivation which results from the metals in the feedstock. The buildup of other catalyst poisons on the catalyst, such as the coke precursors, nitrogen and sulfur, can be effectively controlled by using catalyst coolers to negate the effect of coke formation from the asphaltene compounds, using regenerator flue gas treating to negate the environmental effects of feed sulfur, and using a short contact time FCC process, such as that described in U.S. Pat. No. 4,985,136, to negate the effects of feed nitrogen, and to some degree, the feed metals.

For the past twenty or more years the most widely used FCC catalysts have been zeolitic catalysts, which are finely divided particles formed of a relatively inert matrix, usually silica-alumina, alumina or the like, having a highly active zeolitic material dispersed in the matrix. As is well-known, the zeolites used in such catalysts are crystalline and typically have a structure of interconnecting pores having a pore size selected to permit the ingress of the hydrocarbon molecules to be converted, and the zeolite has a very high cracking activity. Therefore, the highly active zeolite is dispersed in a matrix having a lesser cracking activity in a ratio providing the desired activity for commercial use. Typically used zeolites are of the faujasitic type, e.g., X-, Y- or L-type synthetic zeolites, and from about 5 wt. % to about 70 wt. % of the zeolite is employed. Such zeolitic FCC catalysts, their manufacture and their use in the FCC process are well known by those working in the art.

It is commonly accepted in the oil refining industry that vanadium contained in the residual oil FCC feedstock will irreversibly deactivate the zeolite by attacking the structure, and that this vanadium effect is more pronounced at temperatures above about 1330° F. It is also commonly accepted that catalyst deactivation by hydrothermal deactivation or by metals (e.g., sodium and vanadium) attack is irreversible.

In the operation of an FCC process unit (FCU) the process economics are highly dependant upon the replacement rate of the circulating catalyst (equilibrium catalyst) with fresh catalyst. Equilibrium catalyst is FCC catalyst which has been circulated in the FCC between the reactor and regenerator over a number of cycles. The amount of fresh catalyst addition required, or the catalyst replacement rate, is determined by the catalyst loss rate and that rate necessary to maintain the desired equilibrium catalyst activity and selectivity to produce the optimum yield structure. In the case of operations wherein a feedstock containing residual oil is employed, it is also necessary to add sufficient replacement catalyst to maintain the metals level on the circulating catalyst at a level below which the FCC yield structure is still economically viable. In many cases, low metal equilibrium catalyst with good activity is added along with fresh catalyst to maintain the proper FCC catalyst balance at the lowest cost.

In the processing applications that utilize zeolites, the material must be replaced as it looses its ability to perform the desired function. That is, the zeolitic material deactivates under the conditions employed in the process. In some cases, such as FCC and TCC type catalytic applications, fresh zeolitic material, in this case zeolitic catalyst or additives such as ZSM-5 (described in U.S. Pat. No. 3,703,886), are added on a daily basis. Fresh zeolitic catalyst is added daily at a typical rate of from 1% to as high as 10% of the process unit inventory to maintain the desired activity in the plant. Other zeolitic catalysts, such as those used in hydrocracking, alkylation, dealkylation, transalkylation, isomerization, polymerization, and separation processes, are usually replaced as a batch when the zeolitic material deactivates to a certain point, at which the plant is shutdown and the zeolite replaced.

As will be seen from the following discussion, it is our belief that many types of zeolitic catalyst can benefit from the present invention, because, contrary to popular belief, the major cause of zeolitic catalyst activity decline is zeolite pore blockage which can occur, even during the catalyst manufacturing process, due to free silica or alumina, or compounds of silica or alumina, or other materials which are left behind and block the zeolite pore openings.

A primary object of the present invention is to enable the removal of zeolitic catalyst deactivating materials without destroying the integrity of the catalyst and, at the same time, to significantly improve the activity and selectivity of the catalyst. Another object of the present process is to reactivate zeolite-containing equilibrium catalyst using an environmentally safe and acceptable process. Still another object of the present invention is to improve the activity of various types of zeolitic catalyst and other zeolite-containing particulate solids, especially those that deactivate during use in the processing of hydrocarbons.

A further object of the present invention is improve the FCC equilibrium catalyst activity and selectivity. Another object of this invention is to improve the activity of fresh zeolitic catalyst. Still another objective of the invention is to reduce the requirement for fresh catalyst replacement to an FCC unit, which will reduce fresh catalyst costs, transportation costs, equilibrium catalyst disposal costs, and unit catalyst losses. Other objects of the invention will become apparent from the following description and/or practice of the invention.

SUMMARY OF THE PRESENT INVENTION

The above objects and other advantages of the present invention may be achieved by a process for improving the activity of a contaminated zeolite-containing particulate solid containing one or more contaminants which block the pores of the zeolite and adversely affect the activity of the solid, which process comprises treating the solid by a. forming a slurry of the particulate solid with an aqueous solution containing an activating agent selected from the group consisting of acids, detergents and surfactants, the agent being effective to solubilize or dislodge the contaminants;

b. agitating the slurry under activation conditions including a temperature and a time sufficient to solubilize or dislodge the contaminants, so that the resulting solubilized or dislodged contaminants are carried by the solution from the particulate solid;

c. withdrawing from the slurry a portion of the solution containing the solubilized or dislodged containments;

d. separating the resulting particulate solid from the solution remaining in the slurry;

e. washing the separated particulate solid to remove any residual solution; and f. recovering a treated zeolite-containing particulate solid having a level of activity greater than the activity of the contaminated solid.

We now have discovered that much of the deactivation mechanism for zeolitic materials results from zeolitic pore blockage, which can be reversed. This pore blockage can occur during the production stage by the retention of silica or other binding or matrix material in the zeolite pores. The pore blockage can also occur during the processing stage by silica that migrates to the pores, hydrocarbons from the feed or reaction products, or other materials present in the feed, or catalyst itself, that deposit or migrate into the zeolite pores, thereby blocking off access and reducing the activity of the zeolite. We have indications that hydrocarbon material may help to bind the silica and other feed and matrix material in the pores of the zeolite, or only hydrocarbon material may block the pore. This blockage prevents the reactants from entering the zeolite pores and therefore reduces the activity of the zeolite. Another cause of zeolite deactivation is the dehydration of the zeolitic structure.

We have found that there are various methods for reactivating these zeolitic materials based on (1) chemical treatments, which loosen or solubilize the materials blocking the zeolite pores, and (2) agitation, which aids in mechanically removing the pore blockage material. We have also found that these two steps alone will not satisfactorily reactivate the zeolite unless the material removed from the pores is separated from the reactivated product. For example, we have learned through experimentation that, if one filters the total solution to separate the liquid from the solid without first separating the small particle size material and hydrocarbon material that has caused the pore blockage, the small particles and hydrocarbon material may redeposit in the pores of the zeolite. This redistribution of the small particles and hydrocarbon may again block off pores and reduce the activity of the zeolite. This also happens in fresh catalyst manufacture. Especially in those manufacturing processes that use slurry, the process can be modified to include a separation step that removes these small sized particles, so that the final product would be increased/ improved. As an example, if the exchange of rare earth elements in FCC catalyst manufacture is accomplished in a agitated slurry system, it is possible that the activity of the final product may be reduced because of the redistribution of the material removed from the zeolitic pores in the chemical/ agitation stage. On the other hand, if these pore blocking materials were removed from the solution prior to filtering, the activity of the final product would be increased.

We have now discovered that, in accordance with the present invention, in order to most satisfactorily reactivate the zeolite, it is desirable to separate the pore blocking materials that block the zeolitic pores from the zeolite being reactivated. Such separation allows one to obtain consistent results in a process for improving the activity of zeolitic materials, either during their manufacture or during reactivation.

We have tried a member of chemical methods of reactivating zeolitic materials and they all have increased the zeolitic activity when the chemical treatment was combined with both the agitation of the solid zeolite material in a chemical solution containing an activating agent and separation of the small (<10 microns) pore blocking material that is removed from the zeolitic pores by the chemical treatment and agitation. The same chemical treatment without agitation and separation was found not to greatly improve the zeolitic activity.

The chemical treatment is normally carried out at between 3 and 7 pH and at a temperature less than 212° F. The chemical treatment has been accomplished with activating agents such as enzymes containing degreasing/surfactants, malic acid, active fluorides, hydroxylamine hydrochloride, and other acidic materials, as well as detergents. One can raise the temperature above 212° F. to help obtain agitation by boiling, but then one must provide for fresh liquid makeup and recovery of the vapors. Another option, if higher temperature is proven desirable, is to conduct the operation under pressure, which is more costly.

The agitation can be by stirring, aeration, or tumbling. The preferred method for small particle size materials, such as FCC type catalyst, is to form a slurry of up to 75% concentration of solids and to keep the particulate solid suspended in the solution and also keep the maximum surface area of the solid exposed to the fresh chemical reaction by stirring, and aeration. For larger particle size zeolitic materials, which would include hydrocracking catalyst, polymerization catalyst, ZSM-5 catalyst, and molecular sieves, stirring may not be as practical as just pumping around the liquid in the contacting vessel so that it flows upward through the bed of pellets/extrudates along with the aeration media. The liquid pumparound may be removed below the upper liquid level and returned to the bottom of the contacting vessel to provide a mixing of the chemical liquid in the contactor and an upward flow of liquid with the aeration media to aid in agitation and stripping of the small particles from the zeolile pores. In either case, the small particles liberated from the zeolitic pores may be removed from the slurry continuously or at the end of the reactivation cycle by known particle separation processes, such as flocculation, flotation, elutriation, and clarification, with the preferred method being continuous flotation (defined as: a process whereby the grains of one or more minerals, or chemical compounds in a pulp or slurry, are selectively caused to rise to the surface in a cell or tank by the action of bubbles of air, wherein the grains are caught in a froth formed on the surface of the tank and are removed with the froth, while the grains that do not rise remain in the slurry and are drawn off the bottom of the cell or tank), or a combination of flotation with flocculation or elutriation.

The time of treatment can be varied from several minutes to many hours depending on the temperature, chemical concentration, percent solids, particle size of the zeolite material, and the nature of the material blocking the pores. We have found that the chemical activating agent acts to dissolve and/or loosen the pore blockage material, while the aeration/stirring helps to separate the small particles that have been blocking the pores from the now reactivated material. The addition of surfactants and detergents to aid in the separation of the small particles by flotation or flocculation has also proved beneficial.

BRIEF DESCRIPTION OF THE DRAWINGS

The present invention will be more fully understood by reference to the following description thereof read in conjunction with the accompanying FIG. 1 which is a schematic flow diagram of a preferred process in accordance with the present invention.

DESCRIPTION OF PREFERRED EMBODIMENTS

Figure 1:
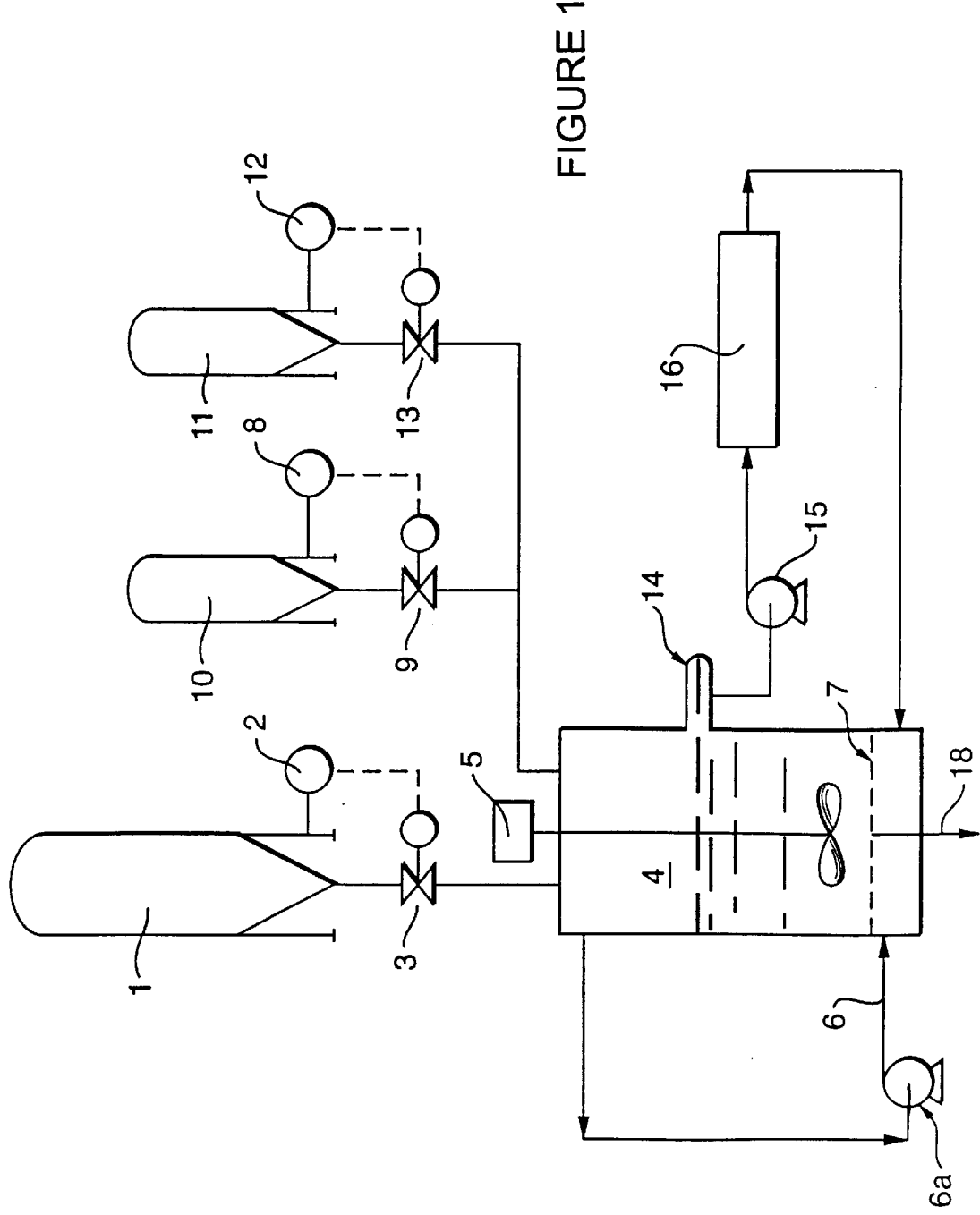

Since one of the largest markets for zeolites is in the manufacture of FCC catalyst, the following process description refers to the reactivation of regenerated FCC catalyst. However, the present invention is applicable to any fresh, spent, deactivated or equilibrium zeolitic containing material. It is only necessary that the surface of the zeolite material be free of coke; that is the coke should be removed by regeneration e.g., contacting spent catalyst with an oxygen-continuing gas at elevated temperature to burn the coke from the catalyst.

The present invention comprises treating zeolite-containing materials in an agitated slurry solution containing a chemical activating agent which has been chosen to loosen or solubilize the materials blocking the zeolite pores, and separating the treated zeolite material from the small particle size materials removed by chemical treatment/agitation from the zeolite pores and the surface of the material before the treated zeolite material is separated from the liquid slurry. This liquid chemical treatment to remove the small particles from the pores of the zeolite can be accomplished in conjunction with other processing steps, such as, chemical removal of metals (Ni, V, Na, Mo, Co, Fe, etc) from equilibrium FCC catalyst or spent hydrocracking catalyst, or exchange of the zeolite with rare earth elements or other cations to modify the activity or selectivity of the zeolite.

The first processing stage is to put the pore blocking material into solution or to loosen the small particles blocking the pores. This may be accomplished by treatment of the zeolite-containing solid particles in an agitated solution containing, as the activating agent, an acid or mixture of acids, followed by a wash treatment to remove the contaminates from the treated catalyst. In the preferred processing method, the agitation of the acid solution is accomplished by both stirring and aeration. It has been found that use of a combination of acids for treatment is more effective, and this is the preferred method.

In applications, such as the treatment of spent hydrocracking catalyst that is oil soaked when it is removed from the hydrocracking reactor, the catalyst preferably is treated to remove the hydrocarbon surface layer, which will interfere with the efficiency of the present process. Normally, these types of spent fixed bed catalyst are regenerated under controlled conditions to remove the hydrocarbon/carbon layer before being treated in our process.

As will be evident from the following example, the mechanism of catalyst reactivation is contrary to the beliefs of those working in the catalyst art. The results of the present invention indicate that the method of catalyst deactivation may be contrary to the accepted theory of irreversible zeolite structure collapse resulting from hydrothermal conditions or metals, such as sodium and vanadium, attack. The results of our testing indicate that the method of catalyst deactivation is reversible. While we may not know the precise method of catalyst deactivation, the results of our testing lead us to theorize that the primary method of catalyst deactivation is zeolitic pore blockage. This blockage is believed to result from the combination of feed components, such as heavy organic compounds, organometallic compounds or polymerization of zeolitic reaction products in the zeolite cage, and/or catalyst base materials, such as alumina and silica compounds.

The preferred acids for use in the invention are weak acids, such as malic, acetic and ammonium bifluoride. For example, malic and may be used to keep the pH at 3.0 or above to minimize the removal or attack on the alumina in the catalyst structure. However, we believe the malic acid acts to loosen the material blocking the pores of the zeolite but is not strong enough to cause noticeable structural changes in the catalyst. The ammonium bifluoride, we believe, also helps to loosen the pore blockage material, which appears to be rich in silica. One can use other fluorides to react with the silica, but very active fluorides such as HF are not recommended because of their environmental/safety concerns and their tendency to remove structural silica. Normally the amount of ammonium bifluoride added to the solution will be less than 10 wt % of the catalyst being reactivated and typically between 1 and 4 wt %. The malic acid will be normally less than 15 wt % of the catalyst being treated and typically between 5 and 10 wt %. As will be seen in one of the examples below, we also used an enzyme, which contained both a detergent and a surfactant, and malic acid to reactivate an equilibrium FCC catalyst. In this case, the aeration media used caused a froth that separated the fine particles from the reactivated catalyst. The preferred enzymatic material contains both a surfactant and detergent which attacks the hydrocarbon binding or blocking agent so that the pore-blocking material in the zeolite cage can be removed and thereby reactivate the zeolite. The acid solubilizes, and the stirring/aeration agitation media combines with the surfactant in the enzymatic material to lift the small particles removed from the zeolite pores to the surface of the solution where they can be removed. The removal of these fine inorganic particles or hydrocarbon materials from the zeolite cage will open the zeolitic channels so that the interior of the zeolite is accessible to the vapor reactants; thereby reactivating the catalyst. It is also believed that the activity of fresh FCC zeolitic catalyst may be increased by this type treatment to remove any free alumina or silica compounds that might be retained in the pores of the zeolite during manufacture. This would also be the case for any fresh or equilibrium catalyst containing zeolites, such as zeolitic hydrotreating or hydrocracking catalyst, ZSM-5, zeolitic polymerization catalyst or molecular sieves.

The results of our testing indicate that agitation with air, as well as dispersion of the solid in the solution by stirring, is also highly desirable. It is theorized that finely dispersed bubble agitation of the solids is advantageous in removing the obstructions from the zeolite pores.

The following Example demonstrates the advantages of the present process when used to reactivate a commercial FCC catalyst formed of a silica-alumina matrix containing about 10–20 wt. % of a type Y zeolite.

EXAMPLE A

A sample of 50 gms of regenerated equilibrium FCC catalyst was placed into a solution of 200 ml of deionized water, 20 gms malic acid and 1 ml of a commercial enzyme and heated to about 130° F. in a magnetically stirred beaker for 12 hours. During this time the solution was aerated with compressed air. The combination of the aeration and detergent in enzyme caused a froth phase to develop on the top of the liquid level. The aeration and froth combined to separate the small particles from the reactivated material and conveyed these small particles upward to the beaker top where they were skimmed off. After 12 hours the treated catalyst was filtered and washed to remove any remaining liquid and contaminants. The equilibrium catalyst (before treatment) and the reactivated catalyst (after treatment) were each tested on a Micro Activity Testing (MAT) unit at a 3:1 catalyst to oil ratio, 16 WHSV, 960F using a standard gas oil. The fresh catalyst activity and the analytical results for the untreated starting catalyst and the treated catalyst are detailed below: (two numbers indicate two tests)

|  | BEFORE TREATMENT | | AFTER TREATMENT | |
| --- | --- | --- | --- | --- |
| FRESH ACTIVITY | 2.8 | | | |
| CATALYST ACTIVITY | 1.4 | 1.4 | 2.3 | 1.9 |
| MICRO ACTIVITY TEST: | | | | |
| CONVERSION | 59 | 59 | 70 | 66 |
| COKE FACTOR | 1.8 | 3.1 | 1.4 | 1.7 |
| GAS FACTOR | 12.1 | 5.3 | 2.2 | 4.9 |

After extensive laboratory testing on zeolite reactivation to determine the proper procedure, five samples of equilibrium catalyst were obtained from five different operating FCC units. Each of these five equilibrium catalyst samples were more than likely mixtures of different types of fresh catalyst from different suppliers, since most FCC units change the type of fresh catalyst they add and also add outside equilibrium catalyst on occasion. However, it is known that these five equilibrium catalyst have a very broad range of activities and metals levels (Ni/V) since these units operate on feeds which go from gas oil to residual oil operations. However, the fresh catalyst added to these units would typically have 20–30% of a Y or USY zeolite with different degrees of active matrix. All of the five samples were treated in the following manner:

1. Regenerated the as received equilibrium catalyst in a muffle furnace at 1250° F. for 4 hours using an oxygen-containing gas.

2. Added 100 gms of the regenerated equilibrium to 500 cc of deionized water.

3. Added 4 gms of hydroxylamine so that pH was between 3.8 and 4.0 at 71° F. The hydroxylamine is used as a reducing agent, mainly to reduce the nickel on the catalyst.

4. Sample from step 3 was placed on magnetic stirrer-hot plate. At 125° F. added 2 gms ammonium bifluoride and 10 gms malic acid (pH of 3.0) and raised temperature to about 150° F.

5. After 2 hours at between 125° F. and 150° F., removed sample from stirrer-hot plate, and allowed the sample to settle until the majority of catalytic material was out of suspension but the fine particle size and colloidal material was still in solution, and decanted the sample to remove the fine particles that were still in solution.

6. Washed the decanted sample 3×with 300 ml of deionized water and decanted after each wash as described in 5 above. Samples of each of the five reactivated equilibrium samples was tested and the results are shown below.

7. 40 gms of each of the five washed reactivated samples from step 6 were exchanged with 3.64 gms of a rare earth element solution (27.46% rare earth element oxides consisting of 12.23% $La_2O_3$, 7.22% $CeO_2$, 5.64% $Nd_2O_3$, 1.95% $Pr_6O_4$) in 100 cc of deionized water. After two hours at 190° F., the now rare earth exchanged reactivated samples were washed 2×with 150 cc deionized water and dried overnight in a drying oven and put in the muffle furnace for 1 hour at 1000° F.

8. The regenerated equilibrium catalyst, the reactivated samples from step 6 and the rare earth exchanged samples from step 7 were tested as detailed below.

The testing was done on a Micro Activity Testing (MAT) unit at a 3:1 catalyst to oil ratio, 16 WHSV, 960F using a standard gas oil. Samples A and C were equilibrium catalyst from FCCU's operating on residual oil. The results of the MAT testing indicated the following:

| SAMPLE | | ACTIVITY | COKE FACTOR | GAS FACTOR |
|---|---|---|---|---|
| A | REGENERATED EQUILIBRIUM | 0.75 | 7.63 | 2.04 |
| A | REACTIVATED | 1.16 | 4.36 | 1.33 |
| A | RARE EARTH EXCHANGED | 1.34 | 4.29 | 1.01 |
| B | REGENERATED EQUILIBRIUM | 1.23 | 2.28 | 1.58 |
| B | REACTIVATED | 1.56 | 2.23 | 1.53 |
| B | RARE EARTH EXCHANGED | 1.72 | 2.32 | 1.69 |
| C | REGENERATED EQUILIBRIUM | 1.02 | 4.71 | 1.50 |
| C | REACTIVATED | 1.25 | 4.39 | 1.12 |
| C | RARE EARTH EXCHANGED | 1.56 | 3.75 | 0.97 |
| D | REGENERATED EQUILIBRIUM | 1.36 | 3.89 | 1.33 |
| D | REACTIVATED | 2.06 | 3.01 | 1.14 |
| D | RARE EARTH EXCHANGED | 1.70 | 3.91 | 1.45 |
| E | REGENERATED EQUILIBRIUM | 1.01 | 1.52 | 1.21 |
| E | REACTIVATED | 1.29 | 2.48 | 1.07 |
| E | RARE EARTH EXCHANGED | 1.20 | 3.29 | 1.17 |

MAT TEST RESULTS

The MAT results above not only show an increase in activity for all of the reactivated samples, but also indicate a selectivity improvement in the reactivated catalyst as compared to the regenerated equilibrium. Samples A, B, and C indicate that there was available zeolite that exchanged with the rare earth elements, which resulted in increased activity and selectivity. Based upon these results, we believe that the mechanism for zeolitic catalyst reactivation is the removal of small particle size material from the zeolytic pores. An analysis of this material indicated it is rich in silica along with the other components of the catalyst including alumina, nickel, and vanadium. We theorize that the pore blockage material is deposited in the pores of the zeolite during the manufacture of the fresh catalyst and by the migration of silica during operation of the processing unit.

The above data indicates that contrary to popular belief, the activity and the selectivity of regenerated FCC catalyst can be greatly improved. Therefore, by practice of the present invention one can remove what is commonly referred to as equilibrium zeolitic catalyst from the processing unit, treat the catalyst as disclosed herein and reuse the treated catalyst having an improved activity and selectivity.

As can be seen from these examples, we believe that the key to a successful zeolitic catalyst reactivation process is removing the zeolitic pore blockage material from the pores of the zeolite and separating this material from the reactivated zeolitic catalyst. The examples indicate that the material blocking the pores can be loosened by mild acids or combinations of acids that are reactive with the pore blockage material and that the best method of separating the fine particles removed from the zeolytic pores is by flotation. The laboratory data also indicates that a mixture of mild acids such as ammonium bifluoride and malic acid at pH of 3 to 5 takes less time than malic acid on its own.

ZEOLITIC CATALYST REACTIVATION PROCESS

In a commercial operation using the zeolitic catalyst reactivation process of the present invention an essentially carbon free catalyst is mixed with a chemical solution containing the activating agent in an agitated contactor vessel to form a slurry. There is withdrawn from the top of the liquid level a portion of the chemical solution which contains the majority of the suspended fine particles and solids liberated from the zeolite pores. This withdrawn solution and fine particles is filtered to remove the suspended solids, and the filtered liquid is returned to the contactor vessel. After a period of time at the desired temperature, the treated, reactivated zeolite is separated from the chemical solution and washed to remove as much as possible of any remaining chemical solution so that the reactivated zeolitic material can be reused.

A commercial FCC catalyst reactivation process would comprise contacting a regenerated catalyst in an stirred and air agitated chemical solution containing an activating agent, that consists of a mild acid, such as malic, or a mixture of mild acids such as malic and ammonium bifluoride, in a contacting vessel. There is continuously withdrawn from the top of the liquid level in the contactor a portion of the chemical solution which contains a majority of the suspended fine particles liberated from the zeolite pores. This liquid is filtered to remove the fine particles and the filtrate recycled to the contactor vessel. After a period of time at the desired temperature, the treated activated FCC catalyst is separated from the chemical solution and washed to remove as much as possible of any remaining chemical solution so that the reactivated FCC catalyst can be reused. Since the FCC catalyst is of small particle size, a stirred catalyst slurry contactor is preferred. Any hydrocarbon released from the zeolitic pores can also be removed from the top of the liquid level in the contactor before the treated, reactivated catalyst is separated from the chemical solution.

Large sized zeolitic materials, such as pelleted or extruded zeolitic catalyst, can also be treated in stirred vessels. However, other forms of agitation, such as tumbling or ebulating beds, or only recirculation of the chemical solution to the bottom of the vessel to give a continuous upward flow of chemical in conjunction with the aeration media can also be used if desired.

The preferred aeration media in any embodiment of the present reactivation process is air, but other gases, such as nitrogen or light hydrocarbon gases, which will act as a flotation media for the small particles of <10 micron may be used.

The present invention can be integrated with an FCC process unit, or the equilibrium catalyst and additives can be withdrawn from the regenerator, cooled, placed in storage and then shipped to a reactivation process to be reactivated and returned to the original site for addition to the FCC process. Based on economics and the ease of integration of the present unique reactivation process with the FCC process, the preferred location of the reactivation process would be in conjunction with the FCC process and not at a remote location.

FIG. 1 illustrates a preferred process flow for the practice of the present invention. Those skilled in the art may know of other equipment which may be employed in the process. It is important, however, that the equipment selected perform the functions described herein so that the desired reactions and results are obtained. In the preferred batch process diagrammed in FIG. 1, the desired weight of regenerated zeolitic FCC catalyst flows from storage hopper 1 by gravity flow, utilizing load cell 2 and control valve 3, into contactor 4 to form a slurry with liquid in the contactor. The liquid in the contactor is water containing the desired amounts of mild acids, which are effective to dislodge and/or solubulize the pore-blocking contaminants in the zeolite pores. Contactor 4 is agitated by mechanical stirrer 5 and air from line 6, which is injected into the bottom of the liquid through air distribution grid 7. Malic acid or a mixture of malic and ammonium bifluoride from storage hopper 10 is added into contactor 4 on weight control using load cell 8 and control valve 9 to control the pH at between 3 and 7, with a pH of about 5.2 being preferred. A surfactant/detergent from storage tank 11 is added on weigh control utilizing load cell 12 through control valve 13 into contactor 4 to control the surfactant/detergent concentration within a suitable range which may be from about 1 ppm to 10 wt %, depending upon the catalyst and conditions employed in the contactor. Such a surfactant and/or detergent forms a foam to aid in floating the small contaminant particles at the top of the liquid in the contactor. Use of the surfactant/detergent along with the contactor agitation will result in the formation of a foam on the top of the liquid level in the contactor as long as there is sufficient active surfactant/detergent in the chemical solution. Therefore, if at any time during this batch process the foam disappears then more surfactant/detergent can be added to restore the surfactant/detergent action which aids in the removal by floatation of the small contaminant particles liberated from the zeolitic pores. Contactor 4 can be operated at ambient temperature, but it is preferred to operate at from about 130° F. to 200° F., but in no case at a temperature that will kill the surfactant/detergent activity. The temperature in contactor 4 can be controlled by an external heat source, such as, a steam coil or jacket on the vessel. Depending on the type of zeolitic material being treated and the chemicals and temperature employed in the processing, the treatment time can be as low as 10 minutes and as long as 36 hours, with 4 to 12 hours being normal.

The aeration supply can be, as shown in FIG. 1, a closed circuit system utilizing compressor 6a to take gas from the top of contactor 4 and recycle it back to the bottom of contactor 4 through distribution grid 7, or it can be a once through system with the aeration media vented from contactor 4.

Contactor 4 is equipped with a sidedraw 14 that controls the level in the contactor. From sidedraw 14, a continuous flow of liquid solution, which contains the small particles which were removed from the zeolite in suspension, is taken through pump 15 to filter 16. The filter shown in FIG. 1, is a plate and frame filter, but any filter that will remove <10 micron particles from the circulating liquid could be used. The filtered liquid is returned to the bottom of contactor 4, where it will flow upward along with the aeration media and aid in removing the small solid particles which are to be liberated from the zeolite pores by the agitated solution containing the activating agent.

After the reactivation process is complete, the aeration media and liquid recycle through the filter is stopped. Before the slurry solution is drained from the bottom of contactor 4, any hydrocarbon that has accumulated on the top of the liquid level can be removed by draining from the sidedraw. The reactivated zeolite and solution are separated, preferably on a belt filter (not shown) and the reactivated catalyst is washed to remove any remaining solution. If necessary, this reactivated material can be dried.

Our testing has indicated that the efficiency of this reactivation process can be improved by the addition of a suitable concentration of ammonium bifluoride to the activating liquid to aid in the removal of free silica from the pores of the zeolite.

Having described a preferred embodiment of our invention, it is to be understood that variations and modifications thereof falling within the spirit of the invention may become apparent to those skilled in this art, and the scope of the invention is to be determined by the appended claims and their equivalents.

What is claimed is:

1. A process for increasing the activity of a zeolite-containing particulate solid containing contaminants which block the pores of the zeolite and adversely affect the activity of the solid, which process comprises:

a. forming a slurry of said particulate solid with a liquid containing at least one activating agent selected from the group consisting of acids, detergents and surfactants, said agent being effective to solubilize or dislodge the contaminants;

b. agitating said slurry under activation conditions, including a temperature and a time sufficient to solubilize or dislodge the contaminants, so that the resulting solubilized or dislodged contaminants are carried by the liquid from the resulting particulate solid;

c. separating the resulting particulate solid from the liquid carrying the solubilized or dislodged contaminants in the contactor;

d. withdrawing from the contactor a portion of the separated liquid carrying the solubilized or dislodged contaminants;

e. separating the resulting particulate solid from the liquid remaining in the slurry;

f. washing the separated particulate solid to remove therefrom residual liquid containing said activating agent; and g. recovering a treated zeolite-containing particulate solid having a level of activity greater than the activity of the contaminated solid.

2. The process of claim 1, wherein the solubilized or dislodged contaminants are removed from an upper liquid level of the agitated slurry in admixture with said withdrawn liquid, the mixture is filtered to remove the contaminants, and the filtrate is recycled to the slurry.

3. The process of claim 1, wherein the agent is malic, acetic, maleic, citric, formic, oxalic, hydrochloric, nitric, or sulfuric acid, ammonium bifluoride, an enzyme, a detergent or a mixture of any of said agents.

4. A process for reactivating a spent zeolite-containing particulate catalyst containing carbonaceous deposits and one or more other contaminants which block the pores of the zeolite and adversely affect the catalytic activity thereof, which comprises:

a. removing carbonaceous deposits from the spent catalyst by contacting the catalyst with an oxygen-containing gas under controlled oxidation conditions, b. cooling the resulting catalyst having a reduced level of carbonaceous deposits, c. forming a slurry of the cooled catalyst with an aqueous solution of an activating agent selected from the group consisting of acids, enzymes, and surfactants effective to solubilize or dislodge the contaminants;

d. agitating said slurry in a contactor under activation conditions, including an elevated temperature and a time sufficient to solubilize or dislodge the contaminants, so that the resulting solubilized or dislodged contaminants are carried by the solution from the resulting catalyst;

e. separating the resulting catalyst from the liquid carrying the solubilized or dislodged contaminants in the contactor;

f. withdrawing a portion of the solution carrying the solubilized or dislodged contaminants from the slurry;

g. separating the resulting catalyst from the solution remaining in the slurry;

h. washing the separated catalyst to remove any residual solution; and i. recovering a treated zeolite-containing catalyst having a level of catalytic activity greater than that of the contaminated solid.

5. The process of claim 4, wherein the acid is malic, ammonium bifluoride, acetic, maleic, citric, formic, oxalic, hydrochloric, nitric, or sulfuric acid, or a mixture of any of said acids.

6. The process of claim 4, wherein the solubilized or dislodged contaminants are removed from the upper surface of the agitated slurry in admixture with said withdrawn solution, the mixture is filtered to remove the contaminants, and the filtrate is recycled to the slurry.

7. The process of claim 1, said catalyst is fresh catalyst, equilibrium catalyst, or spent catalyst.

8. The process of claim 4, where the agitation is effected mechanically, by the introduction of a gas into the slurry, or a combination thereof.

9. The process of claim 4, where the elevated temperature is below 212° F., but not greater than the deactivation temperature of said agent.

10. The process of claim 4, wherein the zeolitic catalyst to be reactivated is a zeolitic catalyst continuously withdrawn from a hydrocarbon processing unit, and the reactivated catalyst is continuously returned to the hydrocarbon processing unit.

11. The process of claim 1, wherein the particulate solid is a zeolitic catalyst which is periodically withdrawn from a hydrocarbon processing unit, and the recovered treated catalyst is returned to the hydrocarbon processing unit.

12. The process of claim 1, wherein the treated solid is subjected to a rare earth element exchange process to introduce one or more rare earth elements into the zeolite.

13. The process of claim 2, wherein the filtrate recycled to the slurry is pumped into a lower portion of the slurry and flows upwardly in the slurry.

14. The process of claim 6, wherein the filtrate recycled to the slurry is pumped into a lower portion of the slurry and flows upwardly in the slurry.

15. The process 13, wherein an aeration medium is introduced into a lower portion of the slurry and flows upwardly in the slurry.

16. The process of claim 14, wherein an aeration medium is introduced into a lower portion of the slurry and flows upwardly in the slurry.

17. The process of claim 1, wherein the liquid contains an acid and a surfactant.

18. The process of claim 14, wherein the aqueous solution contains an acid and a surfactant.

19. The process of claim 17, wherein an aeration medium is introduced into a lower portion of the slurry, and the contaminants are removed from an upper liquid level in the contactor.

20. The process of claim 18, wherein an aeration medium is introduced into a lower portion of the slurry, and the contaminants are removed from an upper liquid level in the contactor.

21. The process of claim 1, wherein the liquid contains an acid and a surfactant; agitation of the slurry is effected by stirring and aeration; and the liquid carrying the solubilized or dislodged contaminants is withdrawn from an upper liquid level in the contactor.

22. The process of claim 4, wherein an aeration medium is introduced into a lower portion of the slurry, and the contaminants are removed from an upper liquid level in the contactor.

* * * * *

UNITED STATES PATENT AND TRADEMARK OFFICE
CERTIFICATE OF CORRECTION

PATENT NO.: 5,900,383

DATED: May 4, 1999

INVENTORS: Robert E. Davis et al.

It is certified that an error appears in the above-identified patent and that said Letters Patent is hereby corrected as shown below:

Claim 1, col. 12, line 43, "detergents" should read --enzymes--.

Signed and Sealed this

Twelfth Day of October, 1999

*Attest:*

Q. TODD DICKINSON

*Attesting Officer*    *Acting Commissioner of Patents and Trademarks*